(No Model.)
F. M. ROBINSON.
FISH HOOK.
No. 556,694. Patented Mar. 17, 1896.
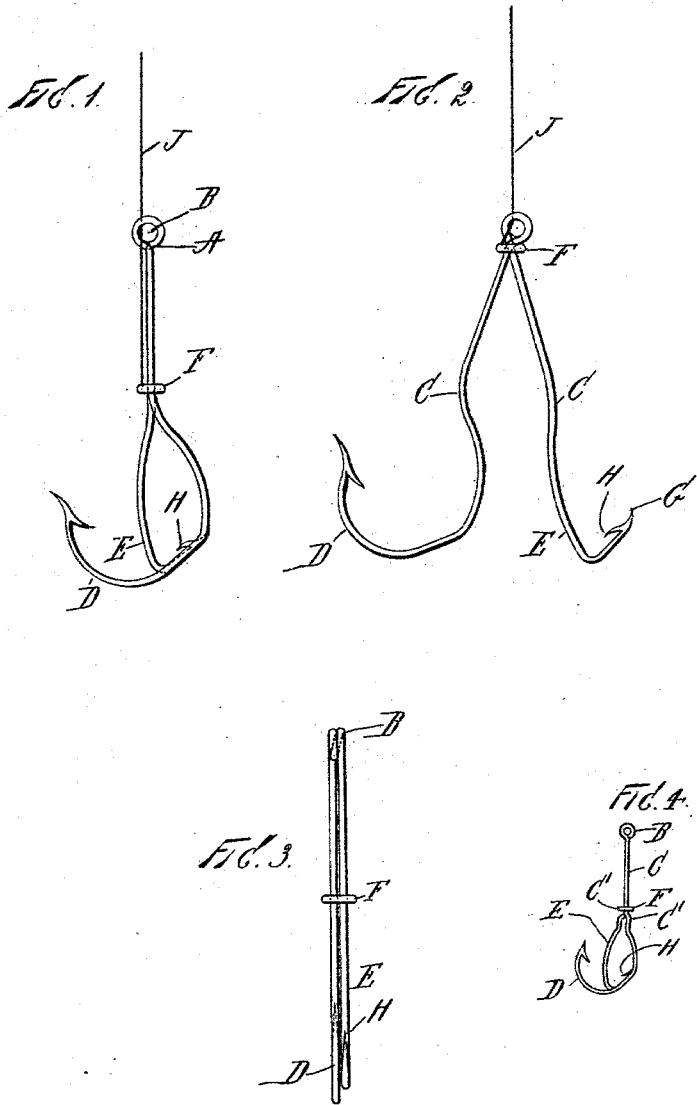
WITNESSES:
John Buckler
L. W. Muller
INVENTOR
Frank M. Robinson
BY
Edgar Tate & Co
ATTORNEYS

UNITED STATES PATENT OFFICE.

FRANK M. ROBINSON, OF PAWLING, NEW YORK.

FISH-HOOK.

SPECIFICATION forming part of Letters Patent No. 556,694, dated March 17, 1896.

Application filed May 18, 1895. Serial No. 549,736. (No model.)

*To all whom it may concern:*

Be it known that I, FRANK M. ROBINSON, a citizen of the United States, and a resident of Pawling, county of Dutchess, and State of New York, have invented certain new and useful Improvements in Fish-Hooks, of which the following is a specification, reference being had to the accompanying drawings, forming a part thereof, in which similar letters of reference indicate corresponding parts.

My invention relates to fish-hooks, and the object thereof is to provide a double spring or snap fish-hook composed of a single piece of wire formed into a loop or eye at or near the central portion thereof, and the shanks of the hooks being straight, or substantially so, for a portion of their lengths and provided with a ring adapted to slide thereon, and the curved portion of the hooks being formed in a peculiar manner, whereby when the shanks of the separate hooks are held together by the sliding ring the point and barb of one of said hooks will lie adjacent to the base of the curve of the other and be concealed, or partially so, thereby.

The invention is fully disclosed in the following specification, of which the accompanying drawings form a part, in which—

Figure 1 represents a side view of my improved combination spring-hook, the shanks thereof being held together by the ring mounted thereon; Fig. 2, a similar view in which the ring has been raised to the highest point and the shanks are separated by the spring action thereof. Fig. 3 is a side view with the ring in the position shown in Fig. 1, and Fig. 4 represents a modification.

In the practice of my invention I employ a highly-tempered spring-steel wire A, in which is formed an eye or loop B, at or near the middle thereof, by bending the wire, as shown in Fig. 2. From the eye or loop B to about the point designated by C the shanks of the hooks D and E are straight, or substantially so, and mounted thereon is a ring F, which is adapted to hold the shanks together when in its lowest position, as shown in Fig. 1, and in Fig. 4 the shanks are provided with shoulders C' to prevent the ring from being pressed too far down.

The curves of the hooks D and E, as will be seen in Figs. 1 and 2, are such that when the ring F is in the lower position, as shown in Fig. 1, the point G and barb H of the hook E will lie close to and parallel with the inner portion of the hook D, which is practically straight at this point, as shown in Fig. 1, by means of which construction, as will be observed, the point and barb of the hook E are concealed, as will be understood, by the inner or base portion of the said curve of the hook D. It will be observed also that the line J is attached to the ring F and passes through the eye or loop B, and in operation the ring F is pressed down to the lowest possible position, as shown in Fig. 1, and if a fish should be caught on the hook D the strain thereof on the line J would draw the ring F up over the shanks of the hooks into the position shown in Fig. 2, when the concealed hook E would immediately spring out, as will be readily understood, and also bury itself in the mouth of the fish, whereby, as will be apparent, the escape of the fish would be impossible, the hooks operating at different points and being securely held from displacement by the spring operation thereof.

My improved hook is particularly adapted for use in catching what are known as "game" fish, and which frequently become detached and succeed in releasing themselves from a single hook, and as is evident it may be used in connection with artificial flies or within any other form or kind of bait, and when constructed and applied in the manner herein shown and described my invention is perfectly adapted to accomplish the object for which it is intended.

Having fully described my invention, I claim and desire to secure by Letters Patent—

A fish-hook formed from a single piece of spring-wire and having an eye B at the middle thereof, a hook formed on each end of the wire, the straight portion adjacent to the eye and a ring arranged on said straight portion to be connected to the line and adapted when in its lowest position to leave one of the hooks wholly exposed and retain the other hook in a concealed position alongside a straight portion in rear of the barb and point of the exposed hook, substantially as described.

In testimony that I claim the foregoing as my invention I have signed my name, in presence of two witnesses, this 17th day of May, 1895.

FRANK M. ROBINSON.

Witnesses:
L. M. MULLER,
S. HAWKSHURST.